Jan. 6, 1953  F. C. HAUMERSON  2,624,546
LIFT MECHANISM
Filed March 27, 1947  10 Sheets-Sheet 1

INVENTOR.
Fred C. Haumerson.
BY
Harness, Dickey & Pierce.
ATTORNEYS.

Jan. 6, 1953 F. C. HAUMERSON 2,624,546
LIFT MECHANISM
Filed March 27, 1947 10 Sheets-Sheet 3

INVENTOR.
Fred C. Haumerson.
BY
Harness, Dickey & Pierce
ATTORNEYS.

Jan. 6, 1953  F. C. HAUMERSON  2,624,546
LIFT MECHANISM
Filed March 27, 1947  10 Sheets-Sheet 4

INVENTOR.
Fred C. Haumerson,
BY
Harness, Dickey & Pierce.
ATTORNEYS.

Jan. 6, 1953  F. C. HAUMERSON  2,624,546
LIFT MECHANISM
Filed March 27, 1947  10 Sheets-Sheet 5

INVENTOR.
Fred C. Haumerson.
BY
Harness, Dickey & Pierce.
ATTORNEYS.

Jan. 6, 1953  F. C. HAUMERSON  2,624,546
LIFT MECHANISM

Filed March 27, 1947  10 Sheets-Sheet 10

INVENTOR.
Fred C. Haumerson.
BY
Harness, Dickey & Pierce
ATTORNEYS.

Patented Jan. 6, 1953

2,624,546

UNITED STATES PATENT OFFICE 2,624,546

LIFT MECHANISM

Fred C. Haumerson, Racine, Wis., assignor to Walker Manufacturing Company of Wisconsin, Racine, Wis., a corporation of Wisconsin Application March 27, 1947, Serial No. 737,609

16 Claims. (Cl. 254—144)

This invention relates to hoisting devices, particularly for automobiles, trucks and other vehicles, having as its primary object the provision of an improved cable-operated hoist incorporating a lifting frame or platform of generally rectangular form onto which a vehicle may be driven and by which it may be lifted while remaining in a horizontal position, wire rope cable means being provided and arranged to support the four corners of the platform.

An important object of the invention is to provide such an improved lift structure having four upright posts arranged at the corners of the lifting frame and serving as housings within which the cable means and its operating mechanism are concealed, the mechanism being so designed that no structural members extend between the corner posts other than the lifting frame itself and a single cross-connecting shaft.

Another object is to provide such a four-post cable-type lift wherein the cable is entirely concealed within the post and the lifting frame and wherein a total of two cables are provided, arranged in such manner as to support all four corners of the lifting frame, as previously indicated, yet so disposed that neither the load nor the cable reaction exerts any lateral stress upon the posts, which are loaded entirely in vertical compression.

Still another object is to provide a lift mechanism which presents a neater appearance than previously known cable-type four post lifts.

Another important object is to provide improved stabilizing means for maintaining the lifting platform in horizontal position regardless of uneven loading of the platform, which stabilizing means also serves as a safety device in event of cable breakage.

Another object is to provide a novel structural assembly in which both the corner posts and the main rails or framework portions of the lifting platform are of rigid box-like construction and function also as housing means for the lifting cables, and wherein the corner posts also serve as housing means for safety devices adapted to prevent the platform from falling in event of cable failure.

Still another object is to provide in such a lift structure improved pan-type drive-on wheel supporting means of simple, reliable and easily operable construction, such supporting means being automatically adjustable to accommodate vehicles of variant wheelbases.

A further object is to provide in such a lift readily interchangeable means whereby vehicles may be lifted either with the wheels resting in pan-like supports or by so-called "free wheeling" supports which sustain the vehicle from beneath and independently of its wheels, so that the wheels are rotatable while the vehicle is elevated.

Other objects and advantages will be apparent upon consideration of the remaining portion of the present disclosure.

In the drawings:

Fig. 3 is a vertical sectional elevational view taken substantially on the line 3—3 of Fig. 1 and looking in the direction of the arrows, showing the upper extremities of the front posts and the hoist and hoist-driving means carried thereby;

Fig. 3B is an exploded perspective view of the drag mechanism;

Fig. 15 is a schematic wiring diagram;

Figure 1:
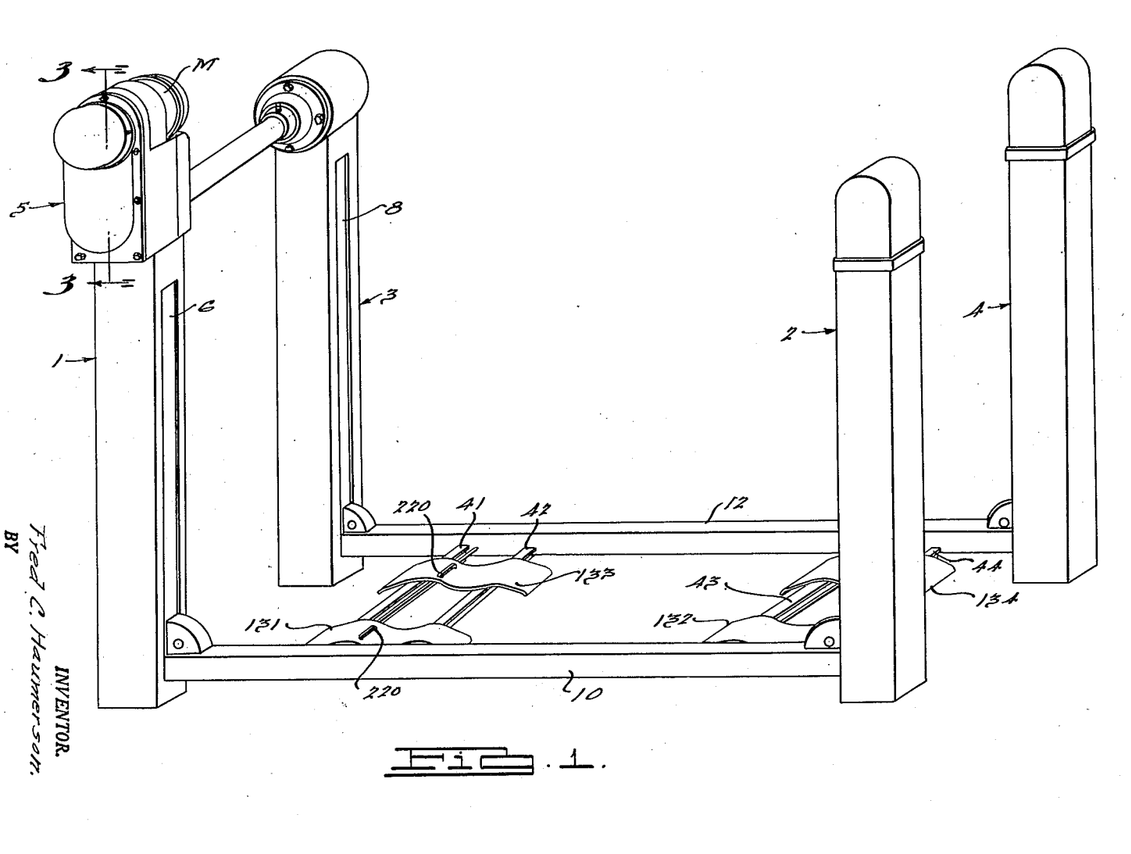
Fig. 1 is a perspective view of a lift constructed in accordance with the present invention.
Figures 2, 3A:
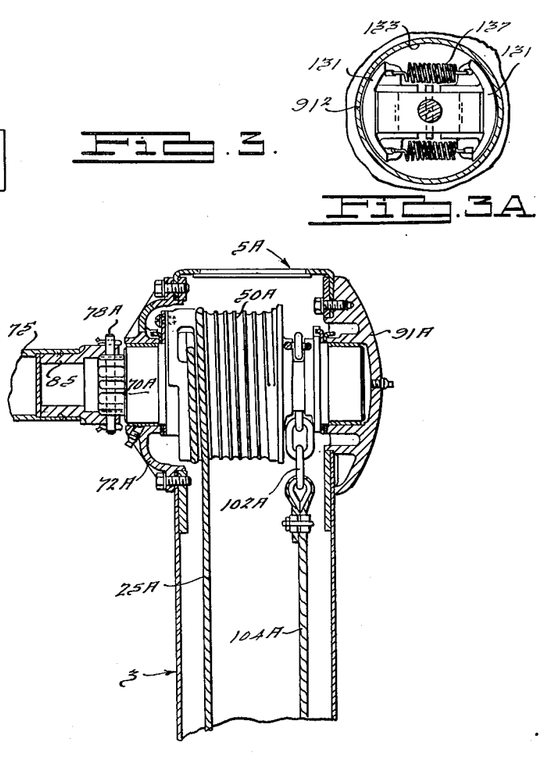
Fig. 3A is a cross section taken substantially on the line 3A—3A of Fig. 3 and looking in the direction of the arrows.
Figures 2A, 9:
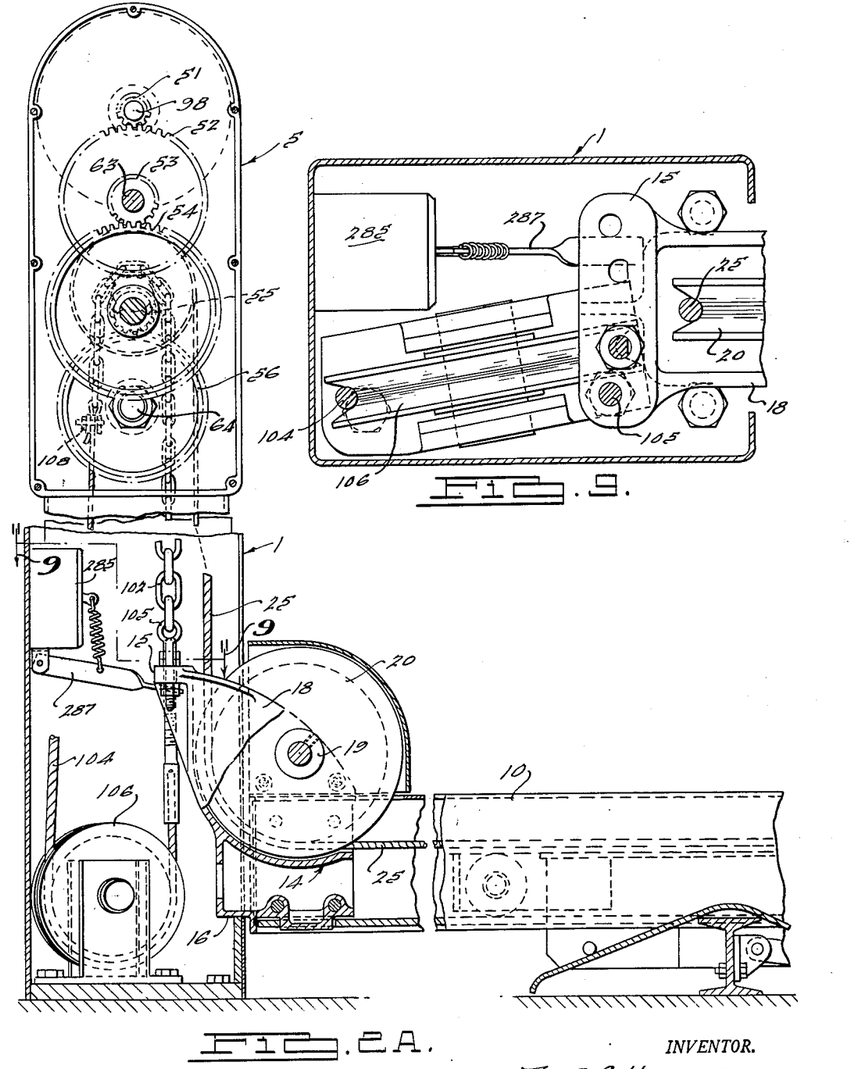
Figs. 2A and 2B are views partly in side elevation and partly in vertical sectional elevation, arranged to be read in juxtaposition with Figure 2A at the left, showing the principal components of the front and rear corner posts at one side of the lift structure, and also showing the lifting frame portion, parts being broken away and shown in section, and the upper portion of Fig. 2A, which is on a somewhat reduced scale, being taken substantially on the line 2A—2A of Fig. 3.
Fig. 9 is a horizontal cross-sectional view taken substantially on the line 9—9 of Fig. 2A and looking in the direction of the arrows.

Referring now to the drawings, reference characters 1, 2, 3, and 4 designate generally the four upright supporting posts for the lift, which posts may be anchored in the floor in the quadrangular arrangement now regarded as conventional for lifts of this class. Vehicles to be raised are driven or rolled into the rectangular area between the posts from one end, as between the posts 2 and 4. The posts are of rectangular cross section, as best shown in Fig. 9, the rectangular sides of the posts being parallel to one another and to the rectangular car-receiving area. One face of each post is provided with a vertical slot as 6, 7, 8, 9, the length of which substantially conforms to the vertical travel of the vehicle supporting frame or platform.

The slots 6, 8 are arranged in the rear faces of the front posts 1, 3, while slots 7, 9 are formed in the front faces of the rear posts 2, 4, respectively.

Figure 6:
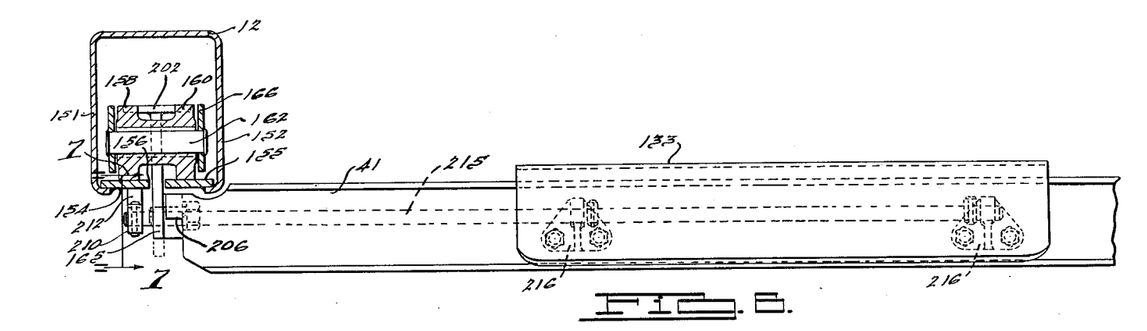
Fig. 6 is a sectional detail taken substantially on the line 6—6 of Fig. 5 and looking in the direction of the arrows.
Figure 7:
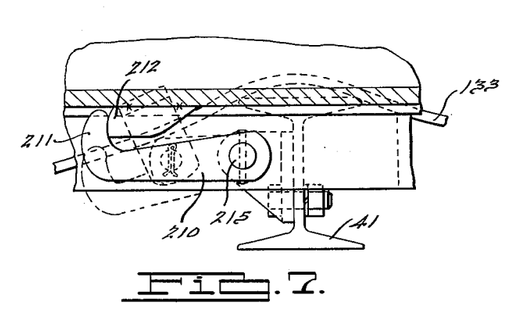
Fig. 7 is a sectional detail taken substantially on the line 7—7 of Fig. 6 and looking in the direction of the arrows.

The main frame members of the lifting platform comprise longitudinally disposed side rails 10, 12. The ends of rail 10 are provided with fittings 14, 24, traveling in the opposed slots 6, 7 of posts 1 and 2 while the ends of the opposite side rails 12 are provided with similar fittings traveling in the corresponding inwardly facing slots 8, 9 of the posts 3, 4. The side rails 10—12 are also of rectangular cross section, as best indicated in Fig. 6, and may, like the posts, be fabricated of sheet metal. The side rails are somewhat shorter than the space between the front and rear corner posts to accommodate the fittings 14, 24. Front fitting 14 has a portion 16 slidably projecting into the slot as 6 of the adjacent corner post. At the rear end of the rail the somewhat similar casting as 24 projects slidably into the adjacent slot as 7. Formed integrally with the fitting 14 is a supporting structure comprising a pair of upright parallel webs 18. Webs 18 are so disposed as to support, in the integral bearing portion 19, a sheave 20 so mounted that its groove lies in a vertical plane substantially centered with respect to both the post and the rail, and the sheave projects into both the corner post and the rail so that the cable 25 may be trained downwardly through the post, under the sheave and horizontally through the rail.

The cable 25 is adapted to be drawn upwardly through the post 1 at will, or paid out and allowed to move downwardly through such post, under the control of winch mechanism mounted upon the top of the post 1 within a housing structure generally designated 5. Such winch mechanism will presently be described in greater detail. The cable passes longitudinally through the side rail and under a sheave 20 mounted at the opposite end of the rail in a position corresponding to that of the sheave 20 and likewise projecting into both the rail and the post 2. The cable is then led up through the post 2 to an anchor bracket 33 near the upper end of the post. The rail 10 is thus slung in the cable in such manner that it may be raised and lowered by means of the winch, as will be apparent, and corresponding synchronously acting means is also provided for raising and lowering the opposite side rail 12, the two rails being rigidly cross connected, as by the tie beams 41, 42, 43, and 44.

Sheave 30 of the rear fitting is journaled in bearing portions 29 carried by gusset-like webs 28 integral with fitting 24 and projecting upwardly and outwardly from the end of the rail and through the slot 7 into the interior of post 2 where they carry safety stop mechanism presently to be described in greater detail. The anchoring means for the end of cable 25 also includes a rod 41 secured to the end of the cable and forming an upward prolongation thereof, the rod projecting through an aperture (undesignated) in the horizontally disposed sheet metal bracket portion 33, which is welded or otherwise fixedly positioned in the post near its upper extremity as previously indicated. The upper end of rod 41 is provided with a cap 42 of inverted cupped form retained upon the rod as by a nut 43, a helical compression spring 44 being trapped between the cup and the bracket 33, and positioned by the cup, to provide cushioning and takeup means for the cable. A cover 130 conceals the anchor means and finishes the top of post 2.

The winch housing portion 5 of the front post 1 forms an upwardly extending continuation thereof and at its lower end is open into the interior of such post. Cable 25 extends upwardly into the housing portion 5, where it is wrapped about and secured at its end to the winch drum 50. The drum is drivable by means of an electric motor M mounted on top of the winch housing. Driving connection between the motor and the winch drum includes reduction gearing comprising conventionally arranged spur gear and pinion sets. Pinion 51 is direct driven by the motor through flexible coupling 61, and drives gear 52 fast with pinion 53 on idler stub shaft 62. Pinion 53 drives gear 54 fast with pinion 55 on idler stub shaft 63. Pinion 55 drives gear 56 fast upon the countershaft 64 which also carries the back gear 57 meshing with a gear 58 secured as by screws 65 to the end of the drum 50. The drum is journaled in smooth bearings 66, 68 carried by housing 5, the last-mentioned bearing engaging a surface portion of the drum between its helically grooved cable-receiving portion 60 and the drum driving gear 58. The web portion 71 of casing 5 which supports the bearing 68 forms the inner wall of the casing and gear 58 lies outside the casing as does its driving pinion 57, these gears being enclosed by a sheet metal cover 72 apertured for passage of a cross connecting shaft assembly 75 therethrough directly connected to and drivable by the drum 50. An axial splined extension 76 of the drum bearing portion 70 is received in the splined end portion of a tubular coupling member 80 welded or otherwise secured to one end of the tubular cross connecting shaft 75. A pin 78 limits axial movement of the splined portions. The other end of the shaft is connected with a similar coupling member 85 which drives a winch drum 50A corresponding to the drum 50 and contained in a housing 5A mounted on top of the post 3. A splined bearing hub portion 70A of winch drum 50A receives the splined cross shaft coupling member 85, and these parts are held against axial movement by a pin 78A. Drum 50A, which is of the same size as the drum 50, accordingly turns synchronously with the drum 50 to permit the cable 25A, corresponding to the cable 25 previously described, to be drawn in and payed out with and at the same rate as the cable 25, so that the side rail 12, similarly suspended in cable 25A, may be lifted and lowered at the same rate, the lifting frame thereby remaining in horizontal position. Parts associated with the posts 3, 4 and the lifting rail 12 corresponding to parts associated with the posts 1, 2 and lifting rail 10 are designated by like reference characters distinguished by the addition of the letter "A" to each, and most of these parts will be seen to require no separate description.

Turning of the drums, gearing and motor shaft in the direction corresponding to downward movement of the load is opposed by a constant drag which is sufficient to hold the load suspended except when the motor is energized. The drag mechanism is contained in a supplemental housing formed by a re-entrant section 91' integral with the gear case cover 91, and by a cooperating supplemental cover 91² removably secured to the main cover 91. The drag housing thus formed is of circular cross-section and arranged coaxially with respect to the motor shaft. The drag shaft 90 is directly coupled to and forms an axial extension of shaft portion 96, the later being driven by and co-axial with the motor shaft and carrying pinion 51.

A friction disk 93 is keyed against rotation in the drag housing but is free to move axially thereof along its supporting key means 127. The key means may be cast integrally in the re-entrant drag housing portion 91'. Friction disk 93 is frictionally gripped between a pair of disks 97, 101 urged thereagainst by helical compression springs 103. Springs 103 are trapped upon positioning pins 107 and between the plate 101 and a spring supporting and reaction plate which is mounted rigidly with respect to the plate 97. A hub portion integral with plate 97 is formed as a sleeve 109 upon which the disk 101 slides and to the end of which the disk 129 is attached as by the screws 111. An inner sleeve portion 113 formed as an integral collar carried by the plate projects into the sleeve 109, and a cooperating inner sleeve portion 117 of the same diameter forms an extension of and abuts against the end of sleeve portion 113, but is keyed to a hub element 119 which is in turn secured to the shaft 90 as by means of the pin 121. Thus, sleeve section 117 turns as a unit with the hub 119 while sleeve section 113 turns as a unit with plates 97, 101. The hub 119 is smaller than the internal diameter of sleeve sections 113, 117, and an overrunning clutch spring 123 is interposed between such sleeve sections and the hub 119 and is wound in such direction as to be expanded against the sleeve sections 113, 117 when the motor shaft and drag shaft 90 are turned in a direction corresponding to lowering of the load. At such time, the disk portions 97, 101 are positively driven through the spring 123 and drag is accordingly imposed upon rotation of the shaft in such direction. Since the reactive torque effect of the drag is multiplied by the drive gearing previously described, the imposition of a normal load upon the platform cannot turn the motor shaft, and the load accordingly remains suspended until the motor is positively energized in a direction to lower the load. When the motor is rotated in a direction to raise the load, the spring clutch assembly overruns and hub 119 turns freely, so that no additional load is imposed upon the motor during lifting of the load.

In the engaging faces of the disks 93, 97, 101, relatively shallow grooves are cut, as indicated at 92. These grooves are substantially tangential with respect to the center openings in the disks, but the grooves on abutting surfaces extend in opposite directions so that they cross one another at substantial angles at all times. Since the abutting grooves can never become parallel, there is no tendency on the part of the outer corner portions of the grooves to strike and injure one another. Such grooves not only tend to prevent the trapping of air between the disks, but urge the air outwardly from between the disks and insure full efficiency of the friction surfaces at all times.

An additional safety device is provided in the form of a governor adapted to limit unduly rapid rotation and resultant overly fast dropping of the load, in event of failure of the drag. The governor comprises a pair of conventionally arranged radially movable fly weights 131 normally held in indrawn positioning and free of a cylindrical drum surface 133 formed upon the inside of the cover portion 91². The retracting springs 137 for the weights are so designed as to limit the speed of the shaft 90 and slow the rate of movement of the lift, in the well known manner, by braking engagement with the surface 133.

The housing structure 5 is contoured to support suitable bearing means for the gearing, winch drum and the like, includes a tubular supporting portion 95 for the countershaft 64 and serves as a closure for the upper extremity of post 1, as previously indicated. Bracket means 96 also carried by the housing serves to support the outer extremities of stub shafts 62, 63 and the motor extension shaft 90. A shroud 99 formed of sheet metal completes enclosure of space between the gear casing and drag housing sections and the motor M.

The casing 5A mounted at the top of post 3 is provided with front and rear belled closures 72A, 91A, respectively, and it will be observed that the arrangement is such that all portions of the operating mechanism are fully enclosed, with the single exception of the cross-connecting shaft 75.

In order to prevent the load supporting platform 4 from tilting toward the front or rear in event of unequal distribution of the load weight thereupon, stabilizing means is provided within the posts 1 and 3 and so connected to the front extremities of the side rails 10, 12 as to force such rail extremities to move at half the rate of the hoisting cable, thereby maintaining a positive relationship between the position of the cable and the rail ends, corresponding to the positions in which the rails extend horizontally, and the result being to prevent the rails from assuming an angular relationship with respect to the horizontal. Referring to the stabilizing means contained in post 1, it will be noted that a chain driving sprocket portion 100 is formed integrally with the drum 50. A chain 102 is engaged with and drivable by the sprocket 100, one leg of the chain extending downwardly to rigid connection with the bracket portion 15. The chain is connected to bracket 15 by a coupling eye-bolt 105. A continuation 104 of the chain, formed of cable, is also connected to the bracket portion 15 and extends downwardly from the bracket, is trained under a sheave 106 supported near the lower extremity of the post and then upwardly to connection with the other leg of the chain, to which it is attached by means of a connector 108. The length of the chain engageable with the sprocket 100 exceeds the vertical travel of the lift, so that the looped chain-cable assembly is positively driven in fixed relationship with respect to the main hoisting cable 25. The effective diameter of the sprocket 100 is one-half that of the drum 50, so that the chain-cable assembly 102, 104 induces movement of the bracket 15 and the connected end of the rail 10 at the same rate as does the hoisting cable 25. The stabilizing chain-cable assembly takes so much of the load as may tend to rock the lifting frame assembly about a transverse axis, transferring such loading directly to the drum sprocket assembly 50—100.

The stabilizing chain-cable assembly 102A, 104A and related parts housed in the post 3 correspond to the previously described stabilizing elements contained in post 1, and no detailed redescription thereof will be required.

It will be appreciated that in event of breakage of the main hoisting cable 25, the stabilizing chain-cable assembly prevents the front end of side rails 10, 12 from dropping, transmitting the load through the gearing to the drag. The stabilizing means functions in a similar way when the hoist is loaded unequally with the greater proportion of the load nearing the front posts. In event the greater proportion of an unequally distributed load is near the back posts 2, 4, the front end cannot rise due to the fixed relationship between the position of the main hoisting cable and the position of the front end, as determined by the safety chain-cable assembly, and due also to the fact that such rising would require the chain to turn the drum in a direction to lift the entire load.

Figures 2B, 8, 13:
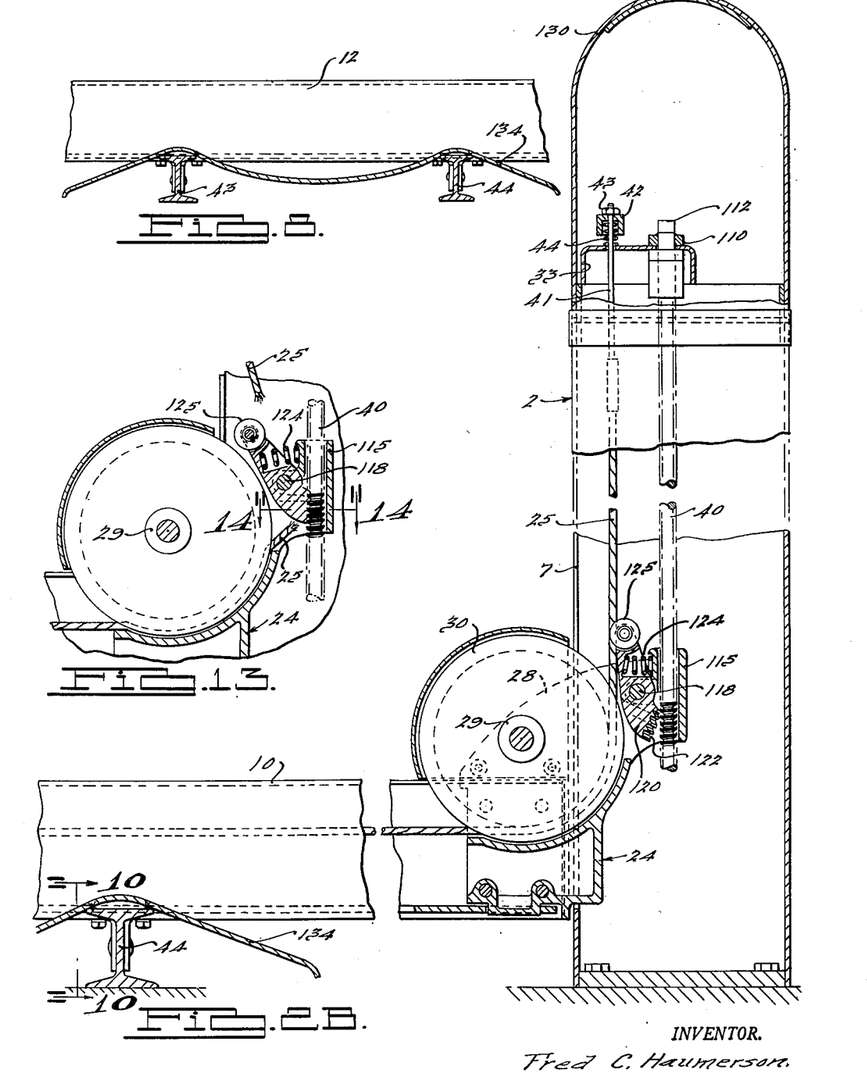
Fig. 8 is a sectional elevational view corresponding to Fig. 5 but showing one of the stationary wheel supporting pans, and on a somewhat smaller scale.
Fig. 13 is a sectional detail of a part of the safety holding mechanism showing the same in the automatically locked position it assumes in event of cable failure.
Figure 4:
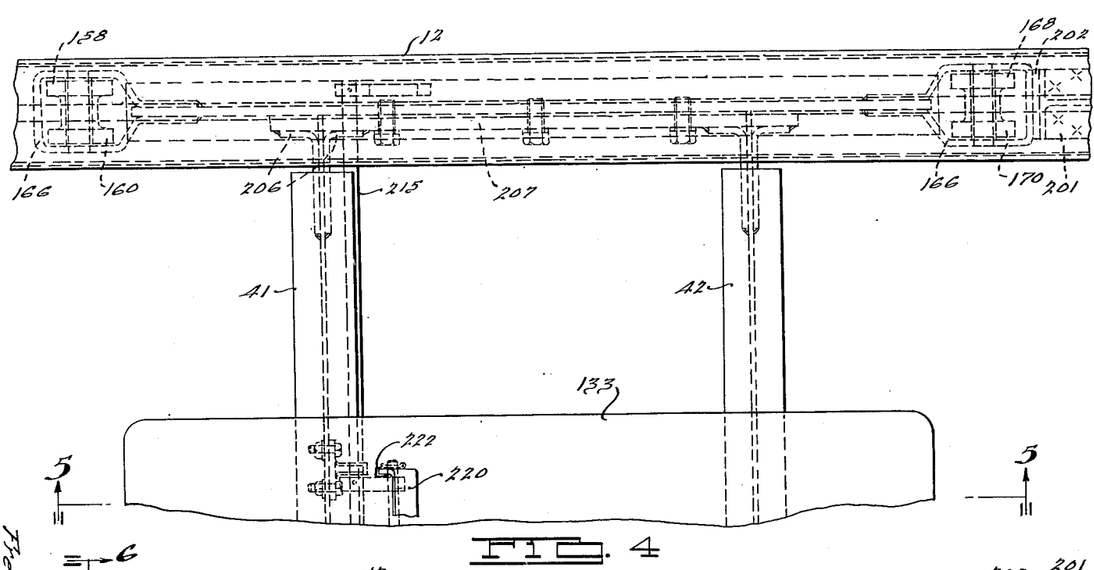
Fig. 4 is a fragmentary plan view of part of the lifting platform and wheel pan structure.
Figure 14:
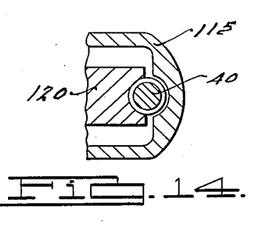
Fig. 14 is a cross section taken substantially on the line 14—14 of Fig. 13 and looking in the direction of the arrows.

Safety holding means are also provided to prevent the rear ends of the rails 10, 12 from dropping in the event of a cable failure. As shown in Figs. 2B, 13 and 14, a screw shaft 40 is rotatably suspended at its upper end in the bracket 33 and extends downwardly in parallel relation to the cable portion 25 within the post 2. A shoulder formed by a washer 110 rigidly attached as by welding to the upper end of the screw shaft 40 overlies the top of the bracket 33, and the portion of the shaft projecting upwardly thereabove is provided with means such as the squared end 112 adapted to receive a crank whereby a screw shaft may be turned manually about its longitudinal axis. A guide portion 115 formed integrally with the webs 28 carried by the rail end fitting 24 projects through the slot 6 in post 2 and slidably embraces the screw shaft 40, riding freely over the tops of the threads of the shaft as the rails move up and down. Pivoted between the side webs 28 and located between the cable 25 and shaft 40 is a safety locking dog 120. The dog is mounted upon a transverse pin 118 transfixing the webs 28 and is provided with a lower extremity having ventilated threads as indicated at 122 conforming, and swingable to and from holding engagement with respect to the helical threads of the shaft. The toothed portion 122 is normally urged toward engagement with the shaft by a helical compression spring 124 which urges the upper end of the pivoted dog away from the shaft 40 and toward the vertical portion of the cable 25, although outward movement of the upper portion of the dog far enough to permit the toothed section 122 to contact the screw shaft is normally prevented by engagement between the roller 125 carried by the upper end of the dog and the cable. In normal operation of the lift, the cable thus rides freely over the roller and the portion 115 slides freely along the shaft. In event the cable breaks or lets go, the slacking of the cable permits the upper end of the dog to move outwardly under the effort of the spring 124, and the lower toothed extremity engages the threads of the shaft, in the manner shown in Fig. 13. This operation occurs very quickly in event of cable failure and the load is thus transferred from the cable to the shaft so that the rear end of the rail 10 is prevented from falling any appreciable distance. Similar safety means, which will require no separate description, is of course incorporated in the other rear post.

In order to lower the platform and its load after a cable failure, the shaft 40 may be turned in the proper direction by means of a crank (not shown) applied to the upper squared extremity 112 of the shaft (after removal of the cap or cover 130 which normally finishes the upper extremity of the post 2 and encloses the bracket 33 and the parts carried thereby). The likelihood of both cables 25, 25A breaking at the same time is of course very remote, and it will be noted that, assuming a failure occurs in cable 25 only, the other side rail 12, which is still supported by cable 25A, and the front end of the rail 10, which is then supported by the safety chain-cable assembly 102, 104, may be lowered by means of the winch mechanism, which may be so operated as to lower the other three rail extremities intermittently or very slowly, while the screw shaft 40 is turned in such manner as to keep the rail ends substantially level.

In the arrangement shown in Figs. 1–15, inclusive, the side rails 10, 12 carry suspended in a horizontal plane between them the four wheel pans 131, 132, 133, 134. Pans 131, 133 are adapted to receive and support the front wheels of a vehicle, while pans 132, 134 support the rear wheels if, as is usual, the vehicle is driven front first onto the lift. Although the parts are referred to as to positioning in this manner, it will be observed that the lift functions equally well with the load in the reverse position. The pans may be formed of relatively heavy sheet metal, centrally dished or depressed to locate the wheels and provided with angularly downturned rear extremities (undesignated) adapted to serve as ramps which engage or lie close to the floor when the lift assembly is in the fully lowered position to permit the vehicle to move easily into position upon the pans.

Figure 10:
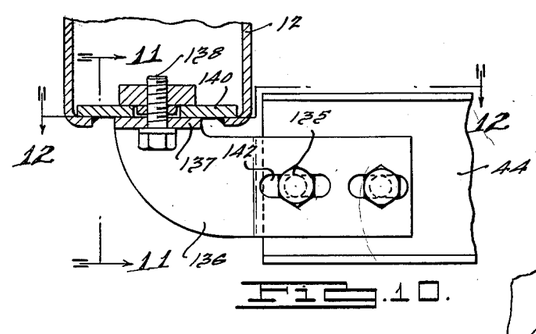
Fig. 10 is a sectional detail taken substantially on the line 10—10 of Fig. 2B and looking in the direction of the arrows.
Figure 11:
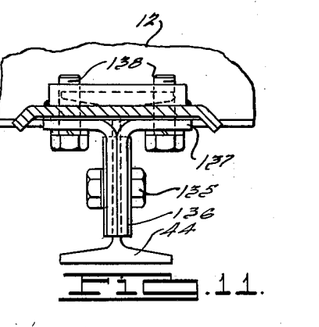
Figs. 11 and 12 are detailed sectional views taken substantially on the lines 11—11 and 12—12 respectively of Fig. 10 and looking in the direction of the arrows.
Figure 12:
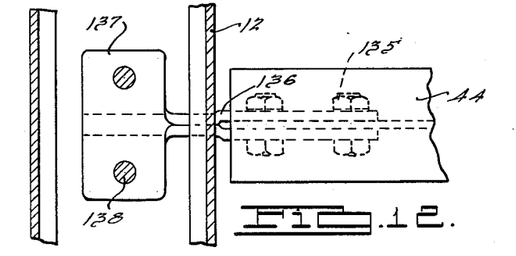
Figure 13:
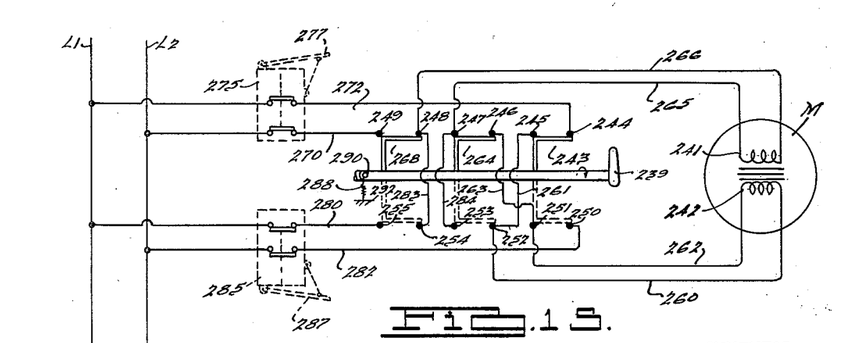

The rear wheel pans 132, 134 are fixedly positioned with respect to the side rails 10, 12 and with respect to the other components of the lifting frame assembly, being supported by the cross tie members 43, 44, to which they may be attached as by welding. At their ends the cross tie members are secured as by means of relatively heavy bolt and nut means 135 to outwardly projecting brackets 136 the outer extremities of which are upturned and fixedly attached to the respective side rails 10, 12, as indicated in Fig. 10. As there shown, the outer end of each bracket 136 is provided with a horizontal flange 137 rigidly secured as by bolt and nut means 139 to a cross plate 140 fixedly mounted as by welding in the lower portion of the side rail as 12. Bolts 135 extend through longitudinal slots 142 in the supporting bracket 136 so that the effective width of the load-supporting platform assembly may be adjusted to permit the spacing between the side rails to conform to any slight deviations from the normal or intended spacing of the supporting corner posts. It will be recognized that this is of great convenience during installation, but that no adjustment is required at this point after installation.

The front wheel-supporting pans 131, 133 are carried by trolley means supported by and freely movable longitudinally with respect to the side rails 10, 12. The cross-sectional contour of the side rails is as shown in Fig. 6, wherein it is indicated that the lower extremities of the parallel side web portions 151, 152 are turned inwardly and support longitudinally disposed horizontal plates 154, 155, forming flat tracks spaced from one another to form a slot 156 therebetween. A plate 165 depends through the slot to support one end of the cross tie member as 41. At each extremity, the plate 165 is rigidly attached as by welding to a looped sheet-metal frame 166 forming a prolongation thereof and extending horizontally around a double roller assembly comprising integrally formed roller portions 159, 160, adapted to roll upon the track plate sections 154, 155, within the hollow rail. The roller portions form the wheels of the trolley assembly and are journaled upon an axial shaft 162 supported at its ends in frame portion 166. The top of the carriage plate 165 may be reinforced by means of a cross web as 202 welded or otherwise rigidly attached thereto. The cross beams 41, 42 are rigidly secured at their ends to the carriage plate 165 as by means of angle brackets 206 welded to a plate 207 bolted to the side of plate 165.

The limits of travel of the trolley assembly are defined by bumper brackets as 201 welded to the inner faces of the side rails, faced with rubber or the like as indicated at 202 and engageable by the ends of the roller frame portions 166.

Longitudinal movement of the trolleys and the front pans 131, 133 carried thereby is normally prevented by latching means including a pair of dogs as 210 one of which is engageable with suitable abutment means as for example the keeper plate 212 secured to the underside of each side rail.

The locking dog and the actuating mechanism therefor associated with each of the front wheel pans are symmetrical and opposite in their arrangement but otherwise alike, so that detailed description of the one associated with the pan 133 will suffice. Dogs 210 move in a vertical plane during swinging movement and travel in parallel relation with respect to the rail during travel of the trolley means. Each dog has an upturned holding portion 211 engageable behind the keeper 212, the keeper being so located that the holding portion 211 is engageable behind the same when the front double pan assembly is moved to the rearward limit of its travel, the parts when so engaged preventing forward movement of such pan assemblies. The dog 210 is carried by a transverse shaft 215 journaled in bracket means 216 attached to the rear face of the central web of cross tie member 41 and extending transversely beneath the pan. A pair of actuating arms 218 are fastened to the shaft at laterally spaced points beneath the pan and project rearwardly in substantially horizontal position. Arms 218 are actuable by a treadle member 220 of inverted U form, formed of relatively rigid strap metal, the downturned legs of the U-shaped treadle being pivotally attached to the ends of the arms 218 and projecting upwardly through slots as 222 in the pan. A transverse portion of the U-shaped treadle extends substantially horizontally of the pan and is positioned to be engaged by the wheel of a vehicle on the pan so that the weight of the vehicle may release the holding portion 211 of the dog to permit the pan assembly to slide forwardly.

Figure 5:
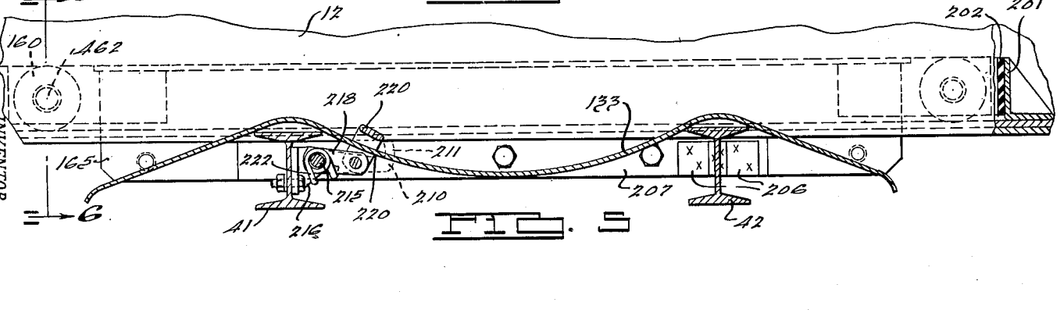
Fig. 5 is a vertical sectional view taken substantially on the line 5—5 of Fig. 4 and looking in the direction of the arrows.

When the latching dogs are engaged with their keepers the distance between the front and rear pans does not exceed the wheel base of the shortest vehicle which the lift is designed to accommodate. When a vehicle of greater wheel base is run into the space between the side rails, the front wheels pass completely over the pans 132, 134 and into the depressed portions of the pans 131, 133 before the rear wheels reach their centered positions in the pans 132, 134. The front wheels release the treadle bar portions 220, freeing the double front pan and carriage assembly for forward movement. Thereafter the front wheels cease to rotate since the front pan and carriage assembly can move forwardly more easily than the front wheels of the vehicle could run upwardly over the treadle bars and off the fronts of the front pans, and the front pan assembly accordingly moves forwardly until the rear wheels of the vehicle roll into their proper positions in the rear pans. The vehicle is then of course stopped with all four wheels properly resting in their respective supporting pans and the hoist may be operated to raise and lower the vehicle as desired. After lowering of the vehicle, when it is to be removed from the lift, it is moved rearwardly, normally under its own power. The rear wheels (which are normally the driving wheels) pass off the rear pans in the backing of the vehicle, while the front wheels remain in the front pans, due to the depressions in the latter, pulling the front pan assembly to the rear until it reaches the latched position. Thereafter, rearward movement of the front pan assembly being arrested, the front wheels roll from the front pan assembly and the vehicle may be backed clear. It will be understood that in event the hoist is to be used with a vehicle which is driven by its front wheels, it is merely necessary to run the vehicle backwardly onto the lift instead of front end first, and identical operation, and automatic adjustment of the spacing of the wheel pans to the wheel base of the vehicle will occur. The dogs are urged toward the latched position by a torsion spring wrapped around the shaft 215 and reacting against the dog and against one of the brackets 216, as shown in Fig. 5, such spring also serving to return the treadle 220 to the elevated position, as will be apparent.

Figure 16:
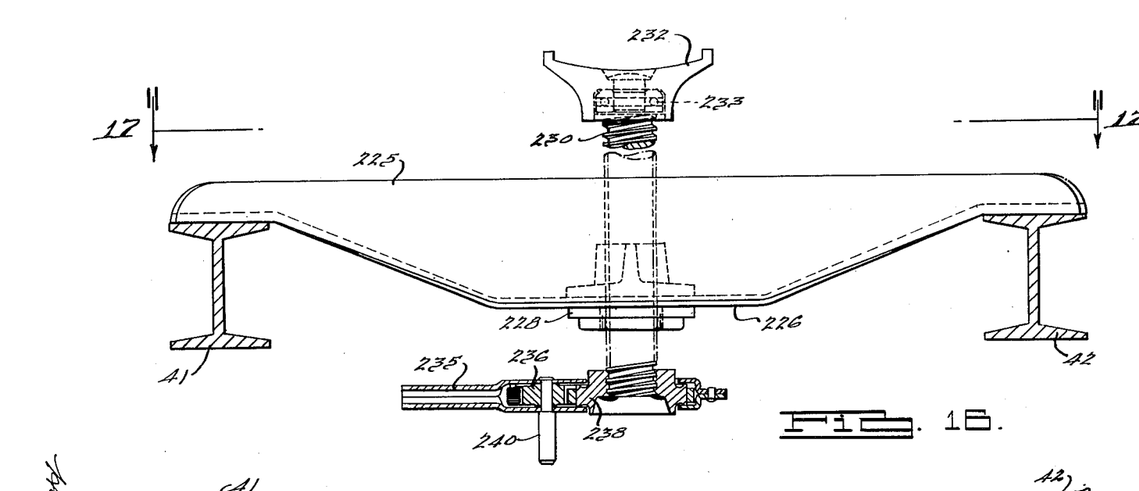
Fig. 16 is a view corresponding to a vertical longitudinal section through the cross tie elements of the lifting frame, showing partly in side elevation and partly in section a modified form of load supporting structure adapted for the "free wheeling" support of a vehicle.
Figure 17:
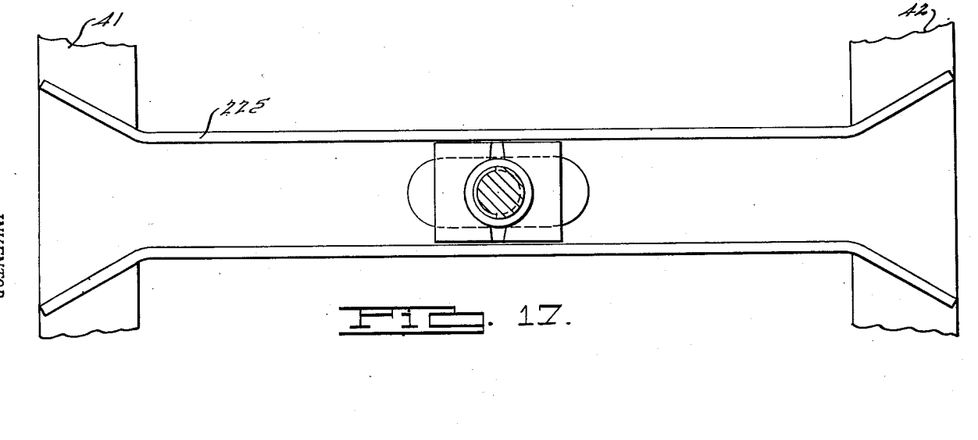
Fig. 17 is a plan view of the modified supporting structure, corresponding to a cross section taken as indicated by the line and arrows 17 of Fig. 16.

When it is desired to elevate the vehicle with the wheels free of the pans, supplemental supports are provided constructed as shown in Figs. 16 and 17. Three or four such supplemental supports are used, each consisting of a beam of U section and of such length as to bridge and to rest on the tops of the cross rails 41, 42 or, alternatively, the rear cross ties 43, 44, the spacing between each pair of ties being the same. Description of one of the beams in detail will suffice. The beam is generally designated 225 and is provided with a dropped horizontal central section 226 which carries centrally disposed therein a relatively massive nut assembly 228 in which a jackscrew 230 is threadably engaged in vertical position. The jackscrew carries at its top a lifting head 232 with respect to which the screw may be independently rotatable, thrust bearing means as 233 being interposed. The screw is rotatable about its axis to raise and lower the lifting head through the agency of ratchet-type actuating means including the handle 235, pawl means 236 carried thereby and a ratchet wheel 238 fixedly secured to the lower end of the jackscrew and engageable by the pawl in the usual manner. The pawl is double ended and is reversible in position, to change the direction in which the screw is rotatable by the handle, through the agency of the pivot pin 240 for the pawl, the pawl being fast upon the pin 240 and the pin projected downwardly to permit the pawl to be rocked so as to engage the ratchet teeth in either direction, as will be apparent. Two such jack-type supplemental supports are arranged between the front pans 131, 133, each extending longitudinally to bridge the rails 41, 42, and it will be appreciated that they may be moved laterally to properly engage beneath the vehicle axle or the lifting pads or other portions with which independent wheel suspensions are commonly provided for the reception of lifting jacks. A second pair of such supplemental jack-type supports may be similarly arranged between the pans 132, 134 bridging the cross ties 43, 44 to engage the other axle or suspension system of the vehicle, or alternatively, one such jack may be positioned midway between the pans. In use, the vehicle is run into place upon the pans, and the hoist is raised in the manner previously described, with the pans supporting the vehicle by its wheels in the same manner. When the hoist has been raised to a convenient height to permit a man to work beneath the same, he may place the jacks in position and then manipulate the several jack handles 235 to raise the vehicle until the wheels are free of the pans. Upon completion of the work, the vehicle is again lowered onto the pans by means of the jacks, and the jacks are removed before the lift is lowered, so that upon reaching the ground level the vehicle may be backed or run from the lift without interference by the jacks.

While the present invention is not particularly concerned with the mode of control of the motor M, a suitable control system is indicated schematically in Fig. 15. As there shown, the motor is of the reversible type, equipped with two field windings 241, 242, the connections of which with respect to the supply lines L may be reversed by reversing switch means of the six-pole double-throw type, actuable by means of a rockable handle 239. When the contact blades 243, 264, 268 of the switch are in the upper position, shown in full lines in Fig. 15, a circuit is completed from supply line L-1 through switch blade 243 and switch contacts 244, 245 which are then connected by such blade to the field coil 242 of the motor by way of a conductor 260, connected to one of the lower contacts 252, the last-mentioned contact being permanently connnected to upper contact 245 by a lead 261. A return connection from field coil 242 is provided by a conductor 262 connected to lower contact 251, which is permanently connected to upper contact 246, as indicated at 263. Switch blade 264 then completes a circuit between contacts 246, 247, the last-mentioned contact being connected to field coil 241 by a conductor 265, return connection from the field coil 241 to supply conductor L-2 being provided by a conductor 266 connected to upper switch contact 248, which is then connected to switch contact 249 by switch blade 268. Contact 249 is connected to the line L-2 by a conductor 270, connection between switch contact 244 and supply conductor L-1 being provided by a conductor 272. When the field coils are connected in the indicated manner through the feed lines 270, 272 the motor may rotate in a direction to raise the hoist. A limit switch, generally designated 275, is arranged to open the circuit through the lines 270, 272 when the hoist reaches the desired upper limit of its travel. The switch is actuable through the agency of an arm 277 projecting into the path of the bracket portion 15 and adapted to be raised by the latter to break the circuit.

When the switch is thrown to the reverse position indicated in dotted lines in Fig. 15, in which the switch blades bridge the lower series of contacts, it will be seen that a reverse series connection is established through the field coils 241, 242, supply line L-1 being then connected to coil 241 by way of conductor 280, contact 255, blade 268, contact 254, permanent connector 283, contact 248 and conductor 266. From coil 241 a connection is established to coil 242 through conductor 265, contact 247, permanent connector 284, contact 253, blade 264, contact 252 and wire 260, a return connection from coil 242 to the supply line L-2 being provided by conductor 262, switch blade 243, contact 250 and conductor 282. This connection may rotate the motor in a direction to lower the hoist. A limit switch 285 is preferably provided for opening the lines 280, 282 to arrest rotation of the motor and stop the hoist when the lifting frame reaches the desired lower limit of its travel. Switch 285 is actuable by an arm 287 which also projects into a position to be engaged by the bracket portion 15, as indicated in Fig. 2A.

The switch is constantly urged to an intermediate position in which all of its contact blades 243, 264, 268, are out of contact with all of the contacts previously mentioned, a spring 288 of the helical tension type being connected to an arm 290 projecting laterally from the switch blade supporting shaft 295 and anchored at its other end to a fixed support 292 to turn the switch blades to the intermediate position in which the motor is de-energized when the switch-actuating handle 239 is released. It is thus necessary for an operator to be present and to positively maintain the switch in one of the two positions shown in Fig. 15 in order to operate the hoist, while in event of any failure of the mechanism the hoist is immediately stopped upon release of the handle 239 and the safety mechanism previously described is automatically activated if necessary.

Figure 18:
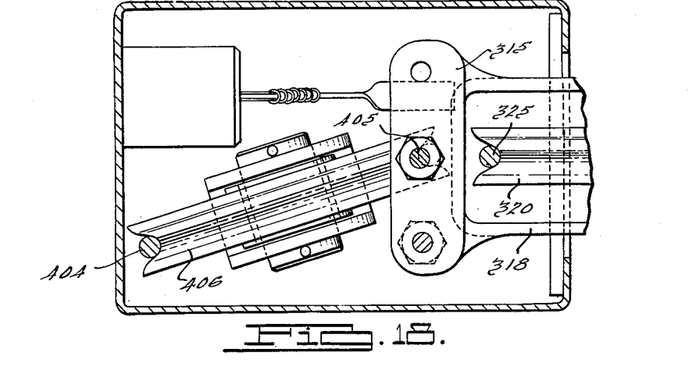
Fig. 18 is a horizontal sectional plan view corresponding to Fig. 9 but showing another somewhat modified construction.
Figure 19:
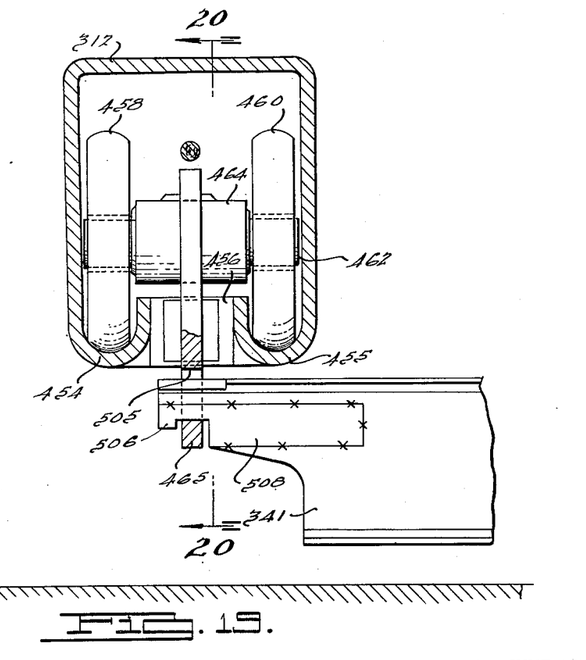
Fig. 19 is a vertical cross-sectional view of a part of the last-mentioned modified construction, corresponding to Fig. 6 but on a larger scale.
Figure 20:
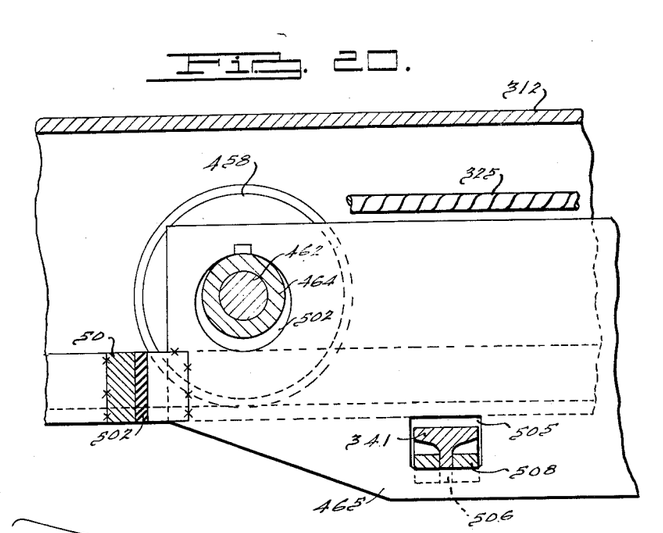
Fig. 20 is a cross-sectional view taken substantially on the line 20—20 of Fig. 19 and looking in the direction of the arrows.

In Figs. 18, 19, and 20, an alternative supporting structure for the movable front pan assembly is shown. As there indicated the inturned bottom flanges of the side rail 312 are turned inwardly and then upwardly to provide re-entrant longitudinal parallel vertically disposed flanges 453 which project back up into the box section rail for a short distance, thereby providing a pair of spaced upwardly opening channel portions generally designated 454, 455, within the rail, the bottoms of which channels may be rounded to partly cylindrical contour. Between channels 454, 455, which serve as tracks, a longitudinal slot 456 is formed through which the supporting portion of the trolley means may depend to carry the supporting structure for the front wheel pans. Each trolley means consists of a pair of wheels 458, 460 adapted to travel in vertical positions in the channel track portions 454, 455 respectively and connected and positioned by a supporting axle 462 extending transversely within the channel 312 above the level of the upstanding re-entrant web portion 453. The axle is journaled in a bushing 464 which extends substantially the full distance between the trolley wheels 458, 460, and a longitudinally arranged plate 465 is suspended from the collar 464 and depends through the slot 456. The plate 465 is provided at its forward extremity with an enlarged opening 502 substantially exceeding the diameter of the collar 464. The apertured portions of the plate hang upon the bushing, as best shown in Figs. 19 and 20. The rear extremity of the trolley frame plate 465 is supported by a similar trolley wheel assembly including a pair of supporting wheels 468, 470 also adapted to ride in the internal channels 454, 455. These and the other portions of the rear trolley wheel assembly will be seen to correspond to those at the front and to require no redescription.

The extremities of the supporting cross ties as 341 for the front wheel pans as 431 are supported in openings 505 in the depending portions of the trolley plate 465. The ends of the tie members are cut away, as indicated in Fig. 19, and provided with downturned ends as indicated at 506 adapted to depend outside the plate portion by which they are held to prevent accidental displacement of the cross ties. Reinforcing plates as 508 may also be welded to the sides of the cut-away portions of the ties to reinforce their supporting extremities. It will be appreciated that the plate 465 may tilt with respect to the supporting bushings 464, and may also move laterally over such collars to the extent permitted by the slot portion 456, thereby permitting the parts to position themselves properly and work freely without regard to any disalignment or distortion of the supporting corner posts or other parts.

Analogous means for locking the rolling carriage assemblies in their rearmost positioning until released by the wheel of a vehicle may be provided, including locking dogs as 210 engageable with keeper means 212 and actuable through trip means analogous with that already described.

It will be noted that if a load sufficient to flex the cross tie members 41, 42 is imposed upon the lift structure first above described, it results in a tendency to rock the trolley assemblies and tilt the rails 13, 12 inwardly at their tops, due to the rigid connections between the cross ties and trolley means. This is equivalent to a tendency to rock the rail 12 clockwise, as viewed in Fig. 6. This tendency is offset by laterally displacing the point of connection of the stabilizer chain-cable assembly with respect to the longitudinal vertical central plane of the side rail, while the sheave 20 and accordingly the plane of suspension of the rail is centered with respect thereto. As best shown in Fig. 9, the coupling means 105 for the stabilizing chain 102 is connected to the bracket 15 nearer the outside of the rail structure. This will be seen to result in a rocking couple tending to twist the rail 12 counterclockwise, as viewed in Fig. 6, and offset the counter-rotating effect of the load.

In the embodiment of Figs. 18, 19, and 20, the stabilizing chain connecting means as 405 may be centered with respect to the bracket 315 and the side rail, since any distortion of the cross ties under loading has no material effect except to slightly tilt the freely hanging plates 465, imposing no tilting or rocking effort upon the side rails.

It will be apparent that the invention is susceptible to further modification and variation without departure from the fair and intended scope of the same as defined in the subjoined claims.

I claim:

1. In a lift of the character described, cable lifting means including a generally U-shaped cable-sling portion, said sling portion including two upright legs and a substantially horizontal transverse bight portion integral with said legs, a lifting frame slung in the bight portion, means for shortening and lengthening the sling portion to raise and lower the bight portion and the frame carried thereby, including winch means for taking up and paying out the cable constituting one of the legs of the sling, and stabilizing means including a portion drivable with said winch and at a fixed speed ratio with respect thereto and having a reversible drive connection with said winch means whereby the winch means is also drivable by the stabilizing means, said stabilizing means being connected to an end portion of said frame to maintain the same in a desired position with respect to the cable and prevent unwanted tilting of said frame.

2. Means as set forth in claim 1 in which the upper end of one leg of the cable sling is anchored within one of said posts, winch means carried by the other posts of the pair near its top and engaging the upper extremity of the other leg of the loop and operable to reel in and pay out the same to raise and lower the bight portion and the lifting frame carried thereby.

3. Means as set forth in claim 1 in which the upper end of one leg of the cable sling is anchored within one of said posts, winch means carried by the other posts of the pair near its top and engaging the upper extremity of the other leg of the loop and operable to reel in and pay out the same to raise and lower the bight portion and the lifting frame carried thereby, said stabilizing means comprising a looped flexible but substantially inelastic driving member also housed within said posts which carries the winch means and having a reversible driving connection with said winch means and engaging a portion of said frame structure to force all portions of said frame structure and the winch to move at a predetermined relative rate corresponding to the rate which maintains said frame structure substantially horizontal during vertical travel thereof.

4. In a four-post vehicle lift construction including a pair of laterally spaced substantially parallel vertically movable side rail portions extending lengthwise of vehicle carried by the lift, hoist means connected to both ends of each of said side rail portions and actuable to raise and lower the same, crosstie means rigidly connecting said side rail portions intermediate the ends thereof and forming therewith a load-supporting platform, and means for offsetting torque tending to turn said side rail portions about longitudinal axes as a result of bowing of said crosstie members under load, comprising stabilizing means connected to one end of each of said side rail portions and laterally offset in such direction from the line of suspension of the side rail portion, which line of suspension is defined by the points of connection of said hoist means to said rail ends, whereby the reaction imposed upon the side rail portions by the stabilizing means tends to counteract the moment resulting from such bowing of the crosstie members.

5. A four-post lift structure comprising four upright hollow posts located at and defining the corners of a quadrangular lift area, a side rail extending between two of the posts representing a pair thereof located upon one side of the lift area and a corresponding rail extending between the other pair of said posts upon the opposite side of said lift area, said rails being carried by the posts and being of hollow construction and each having a longitudinal slot extending along its bottom, vehicle-supporting means including a longitudinally movable crosstie member extending transversely between said rails, a carriage movable within each of said rails, and means projecting downwardly from each carriage through the slot in the rail and supporting said crosstie member.

6. Means as set forth in claim 5 in which said supporting means connected to and extending downwardly from the carriage upon at least one side of the assembly is laterally shiftable with relation to the rail.

7. Means as set forth in claim 5 in which said supporting means connected to and extending downwardly from the carriage upon at least one side of the assembly is laterally shiftable and rockable with relation to its carriage.

8. Means as set forth in claim 5 in which said supporting means connected to and extending downwardly from the carriage upon at least one side of the assembly is laterally shiftable and rockable with relation to the rail.

9. Means as set forth in claim 5 including cable-type lifting means supported by said posts and connected to said side rails to raise and lower the same and including cable portions extending longitudinally through said rails.

10. Means as set forth in claim 5 including cable-type lifting means supported by said posts and connected to said side rails to raise and lower the same and including cable portions extending longitudinally through said rails above the carriage.

11. Means as set forth in claim 5 including a sling-type cable lifting means for each of said side rails comprising vertical cable legs arranged in the posts and a substantially horizontal bight portion extending through and movable longitudinally of each rail above the carriage therein.

12. A four-post lift structure comprising four hollow upright posts arranged at and defining the corners of a generally quadrangular lift area, a pair of side rails, one extending longitudinally between the two posts representing a pair of such posts located upon one side of said area and the other similarly extending between the posts representing the opposite pair, a platform-forming crosstie extending between said rails, support devices for the cross-tie movable on the rails, hanger straps rockably mounted on the devices, opposite ends of the cross-tie being supported on the straps, and means carried by said posts for raising and lowering said rails simultaneously.

13. In a lift construction of the four-post type, a pair of longitudinally disposed substantially parallel side rails, a pair of crosstie members connecting said rails near one end and arranged parallel to one another, a second pair of crosstie members connecting said rails near the opposite end and also disposed parallel to one another, means carried by said crossties and adapted to form rests for the wheels of a vehicle to be lifted, and supplemental freewheeling-type lifting means for raising the vehicle with respect to said crossties and with respect to said first-mentioned supporting means, said supplemental lifting means comprising beams bridging the crossties of each of said pairs of crossties, and vehicle jacking means carried by said beams.

14. In a four-post lift construction comprising four upright hollow posts arranged at the corners of a quadrangular lift area, a lifting frame structure having portions vertically movable with respect to the posts and lying close to the same, sling-type cable lifting means housed at least partly within said posts and extending beneath portions of the frame structure in the form of a generally U-shaped loop, driving means for lengthening and shortening the loop to raise and lower the frame structure, and stabilizing means also arranged within at least one of said posts for preventing unwanted tilting of the frame structure with respect to the posts, said driving means including winch mechanism, said stabilizing means including supplemental reversible driving means operatively interconnecting the frame structure and the winch mechanism.

15. In a four-post lift construction comprising four upright hollow posts arranged at the corners of a quadrangular lift area, a lifting frame structure having portions vertically movable with respect to the posts and lying close to the same, sling-type cable lifting means housed at least partly within said posts and extending beneath portions of the frame structure in the form of a generally U-shaped loop, driving means for lengthening and shortening the loop to raise and lower the frame structure, and stabilizing means also arranged within at least one of said posts for preventing unwanted tilting of the frame structure with respect to the posts, said driving means including a windlass, said stabilizing means comprising a supplemental looped driving member having a two-directional driving connection with the windlass and with the frame structure.

16. In a four-post lift construction comprising four upright hollow posts arranged at the corners of a quadrangular lift area, a lifting frame structure having portions vertically movable with respect to the posts and lying close to the same, sling-type cable lifting means housed at least partly within said posts and extending beneath portions of the frame structure in the form of a generally U-shaped loop, driving means for lengthening and shortening the loop to raise and lower the frame structure, and stabilizing means also arranged within at least one of said posts for preventing unwanted tilting of the frame structure with respect to the posts, said driving means including a windlass appurtenant to one of said posts, said stabilizing means comprising a supplemental looped driving member having a reversible driving connection with the windlass and with the frame structure and housed in said last-mentioned post and comprising a vertically elongated loop of flexible but substantially inelastic character connected at one point to said frame structure.

FRED C. HAUMERSON.

REFERENCES CITED

The following references are of record in the file of this patent:

UNITED STATES PATENTS

| Number | Name | Date |
|---|---|---|
| 1,958,026 | Walker | May 8, 1934 |
| 1,993,060 | Hott | Mar. 5, 1935 |
| 2,044,989 | Brie | June 23, 1936 |
| 2,048,420 | Babel | July 21, 1936 |
| 2,139,597 | Martin | Dec. 6, 1938 |
| 2,199,524 | Kroll | May 7, 1940 |
| 2,238,573 | Steedman | Apr. 15, 1941 |

FOREIGN PATENTS

| Number | Country | Date |
|---|---|---|
| 339,367 | Great Britain | Dec. 11, 1930 |
| 372,573 | Great Britain | May 12, 1932 |
| 441,280 | Great Britain | Jan. 16, 1936 |